United States Patent
Neumann et al.

(10) Patent No.: US 12,466,798 B2
(45) Date of Patent: Nov. 11, 2025

(54) PROCESS FOR THE PREPARATION OF FLUENSULFONE

(71) Applicant: YEDA RESEARCH AND DEVELOPMENT CO. LTD., Rehovot (IL)

(72) Inventors: Ronny Neumann, Kfar Saba (IL); Alexander Khenkin, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 946 days.

(21) Appl. No.: 17/630,523

(22) PCT Filed: Aug. 4, 2020

(86) PCT No.: PCT/IL2020/050852
§ 371 (c)(1),
(2) Date: Jan. 27, 2022

(87) PCT Pub. No.: WO2021/024253
PCT Pub. Date: Feb. 11, 2021

(65) Prior Publication Data
US 2022/0242838 A1 Aug. 4, 2022

Related U.S. Application Data

(60) Provisional application No. 62/882,541, filed on Aug. 4, 2019.

(51) Int. Cl.
*C07D 277/36* (2006.01)
(52) U.S. Cl.
CPC ................ *C07D 277/36* (2013.01)
(58) Field of Classification Search
CPC .................................... C07D 277/36
See application file for complete search history.

(56) References Cited

U.S. PATENT DOCUMENTS

| | | | |
|---|---|---|---|
| 8,901,311 B2 | 12/2014 | Straub | |
| 2003/0187259 A1 | 10/2003 | Kraatz et al. | |
| 2004/0106658 A1 | 6/2004 | Kraatz et al. | |
| 2006/0004196 A1 * | 1/2006 | Straub | C07D 277/36 548/182 |
| 2012/0088805 A1 | 4/2012 | Ohmoto et al. | |
| 2015/0218114 A1 | 8/2015 | Tani et al. | |

FOREIGN PATENT DOCUMENTS

| | | |
|---|---|---|
| CN | 104292156 A | 1/2015 |
| CN | 105646393 | 6/2016 |
| EP | 2 441 751 A1 * | 4/2012 |
| EP | 2891651 A1 | 7/2015 |
| WO | WO 2001/002378 | 1/2001 |
| WO | WO 2004/005268 | 1/2004 |
| WO | WO 2017/002100 | 1/2017 |
| WO | WO 2019/234651 | 12/2019 |
| WO | WO 2020/141514 | 7/2020 |

OTHER PUBLICATIONS

International Search Report for PCT Application No. PCT/IL2020/050852 dated Oct. 2, 2020.
Li et al. (2015). Fluoroalkane thioheterocyclic derivatives and their antitumor activity. European journal of medicinal chemistry, 93, 423-430.
Xu et al. (2017). Synthesis and biological activity of novel sulfone derivatives containing a [1, 2, 4] triazolo [4, 3-a] pyridine moiety. Phosphorus, Sulfur, and Silicon and the Related Elements, 192(7), 850-855.
Chen et al. "Novel amide derivatives containing 1, 3, 4-thiadiazole moiety: Design, synthesis, nematocidal and antibacterial activities" Bioorganic & medicinal chemistry letters. May 15, 2019;29(10):1203-10.

* cited by examiner

*Primary Examiner* — Shawquia Jackson
(74) *Attorney, Agent, or Firm* — Mark S. Cohen; PEARL COHEN ZEDEK LATZER BARATZ LLP

(57) ABSTRACT

This invention is directed to a method of oxidation of 5-chloro-2-((3,4,4-trifluorobut-3-en-1-yl)thio)-1$\lambda^3$,3$\lambda^2$-thiazole and analogs thereof to the corresponding sulfone, using an oxidant and a metal oxide-based catalyst.

22 Claims, 1 Drawing Sheet

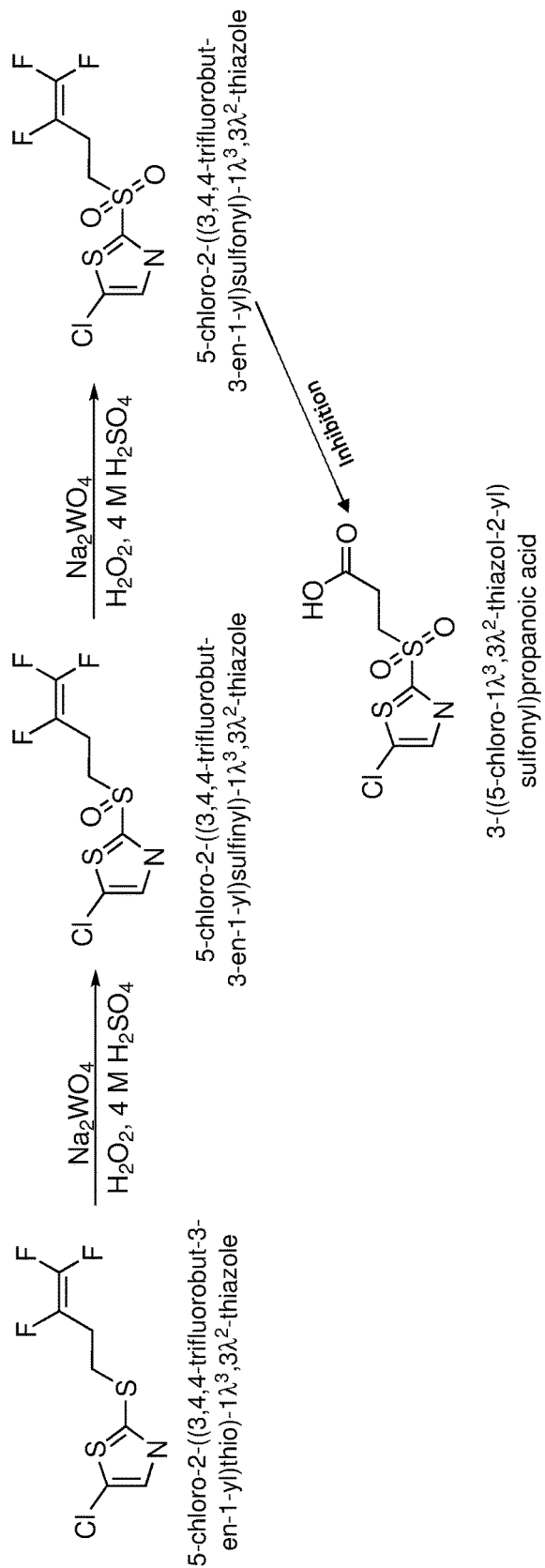

PROCESS FOR THE PREPARATION OF FLUENSULFONE

CROSS-REFERENCE TO RELATED APPLICATIONS

This application is a National Phase Application of PCT International Application No. PCT/IL2020/050852, International Filing Date Aug. 4, 2020, claiming the benefit of U.S. Patent Application No. 62/882,541, filed Aug. 4, 2019 which are hereby incorporated by reference.

FIELD OF THE INVENTION

This invention is directed to a method of oxidation of 5-chloro-2-((3,4,4-trifluorobut-3-en-1-yl)thio)-1$\lambda^3$,3$\lambda^2$-thiazole and analogs thereof to the corresponding sulfone, 5-chloro-2-((3,4,4-trifluorobut-3-en-1-yl)sulfonyl)-1$\lambda^3$,3$\lambda^2$-thiazole (Fluensulfone) and corresponding analogs thereof, using metal oxide-based catalysts and an oxidant.

BACKGROUND OF THE INVENTION

Fluensulfone (5-chloro-2-((3,4,4-trifluorobut-3-en-1-yl)sulfonyl)-1$\lambda^3$,3$\lambda^2$-thiazole) is a nematicide that is effective against a number of plant parasitic nematodes in a range of agricultural and horticultural crops. One method of its synthesis involves the oxidation of the corresponding sulfide, 5-chloro-2-((3,4,4-trifluorobut-3-en-1-yl)thio)-1$\lambda^3$, 3$\lambda^2$-thiazole. WO/2001/002378 describes the oxidation of the sulfide with peroxygen reagents such as 3-chlorobenzoic acid or hydrogen peroxide in the presence of a carboxylic acid such as acetic acid.

A reaction with 3 equivalents of $H_2O_2$ in acetic acid at 60° C. was reported to give Fluensulfone in a 76% yield.

Improved yields were reported by the oxidation of the sulfide with Oxone or Caroat, a triple salt with potassium peroxymonosulfate as active oxidant, $2KHSO_5 \cdot KHSO_4 \cdot K_2SO_4$ (U.S. Pat. No. 8,901,311, WO/2004/005268).

Although improved yields are reported using $2KHSO_5 \cdot KHSO_4 \cdot K_2SO_4$ (U.S. Pat. No. 8,901,311) versus use of $H_2O_2$ (WO/2001/002378), a significant amount of environmentally deleterious sulfate salts are introduced and formed in the reaction versus formation of water only with $H_2O_2$.

The problem with the use of $H_2O_2$ as also stated in U.S. Pat. No. 8,901,311 is that the more difficult oxidation of the intermediate sulfoxide leads to a considerably lower yield. Thus, the further oxidation of the sulfoxide to the sulfone takes place only gradually and sluggishly and requires higher temperatures and longer reaction times. Even more problematically, once the sulfone is formed it reacts further through the oxidative cleavage of the fluorinated double bond yielding 3-((5-chloro-1$\lambda^3$,3$\lambda^2$-thiazol-2-yl)sulfonyl)propanoic acid and HF as undesired by-products. This reaction was surmised to be a result of a non-catalytic nucleophilic attack of $H_2O_2$ mostly on the double bond of the sulfone, which is very electrophilic due to the presence of the fluorine substituents and the neighboring sulfone group. Thus, upon reacting sulfone with $H_2O_2$ even without any catalyst, the formation of 3-((5-chloro-1$\lambda^3$,3$\lambda^2$-thiazol-2-yl)sulfonyl)propanoic acid and HF was observed due to cleavage of double bond. Such an undesirable side reaction also occurs with $H_2O_2$ in the presence of formic acid or acetic acid where reactive oxygenating peracids are formed in-situ or in the presence of commonly used molybdate or tungstate catalysts.

This invention provides the selective oxidation of 5-chloro-2-((3,4,4-trifluorobut-3-en-1-yl)thio)-1$\lambda^3$,3$\lambda^2$-thiazole and analogs thereof to the corresponding sulfone, 5-chloro-2-((3,4,4-trifluorobut-3-en-1-yl) sulfonyl)-1$\lambda^3$, 3$\lambda^2$-thiazole and corresponding analogs thereof, using aqueous $H_2O_2$ as oxidizing agent/oxygen donor, in an aqueous biphasic reaction medium.

A particular advantage in the using an aqueous biphasic reaction medium is that it is easy to separate the water phase containing the catalyst and the organic phase containing the desired product. In this way the catalyst can be recovered and reused quite simply.

SUMMARY OF THE INVENTION

In one embodiment, this invention provides a method for the preparation of a compound represented by the structure of Formula (I):

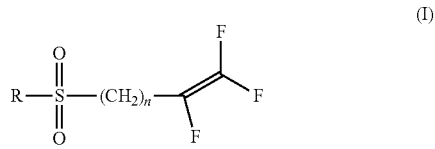

wherein R is heterocyclic ring selected from thiophene, thiazole, isothiazole, thiadiazole and thiatriazole, wherein the heterocyclic ring is optionally halogenated; and n is an integer between 1 and 6, comprising the step of contacting in a reaction mixture a compound represented by the structure of Formula (Ia):

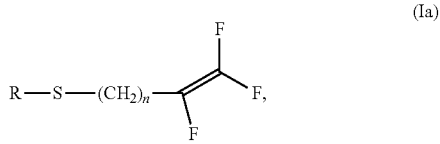

wherein R and n are as defined herein above with $H_2O_2$ in an acidic aqueous phase in the presence of a catalyst.

In another embodiment, this invention provides a method for the preparation of 5-chloro-2-((3,4,4-trifluorobut-3-en-1-yl)sulfonyl)-1$\lambda^3$,3$\lambda^2$-thiazole, comprising the step of contacting 5-chloro-2-((3,4,4-trifluorobut-3-en-1-yl)thio)-1$\lambda^3$, 3$\lambda^2$-thiazole, with $H_2O_2$ in an acidic aqueous phase in the presence of a catalyst.

In one embodiment, this invention provides a method for the preparation of a compound represented by the structure of Formula (I):

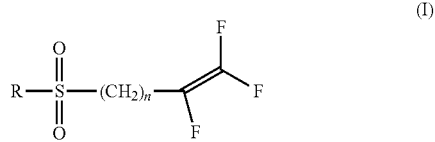

wherein R is heterocyclic ring selected from thiophene, thiazole, isothiazole, thiadiazole and thiatriazole, wherein the heterocyclic ring is optionally halogenated; and n is an integer between 1 and 6, comprising the step of contacting in a reaction mixture a compound represented by the structure of Formula (Ia):

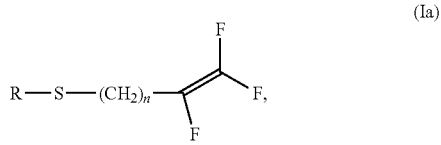

wherein R and n are as defined herein above with a peroxygen oxidant in an acidic aqueous phase in the presence of a catalyst.

In another embodiment, this invention provides a method for the preparation of 5-chloro-2-((3,4,4-trifluorobut-3-en-1-yl)sulfonyl)-1$\lambda^3$,3$\lambda^2$-thiazole, comprising the step of contacting 5-chloro-2-((3,4,4-trifluorobut-3-en-1-yl)thio)-1$\lambda^3$,3$\lambda^2$-thiazole, with a peroxygen oxidant in an acidic aqueous phase in the presence of a catalyst.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 presents a process of this invention for the preparation of 5-chloro-2-((3,4,4-trifluorobut-3-en-1-yl)sulfonyl)-1$\lambda^3$,3$\lambda^2$-thiazole, wherein the process of this invention prevents the formation of the side product of 34(5-chloro-1$\lambda^3$,3$\lambda^2$-thiazol-2-yl)sulfonyl)propanoic acid.

It will be appreciated that for simplicity and clarity of illustration, elements shown in the FIGURES have not necessarily been drawn to scale. For example, the dimensions of some of the elements may be exaggerated relative to other elements for clarity. Further, where considered appropriate, reference numerals may be repeated among the FIGURES to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

This invention is directed to a method of oxidation of 5-chloro-2-((3,4,4-trifluorobut-3-en-1-yl)thio)-1$\lambda^3$,3$\lambda^2$-thiazole and analogs thereof to the corresponding 5-chloro-2-((3,4,4-trifluorobut-3-en-1-yl)sulfonyl)-1$\lambda^3$,3$\lambda^2$-thiazole (Fluensulfone) and corresponding analogs thereof, using metal oxide-based catalysts and an oxidant. In another embodiment, the oxidant is a peroxygen oxidant. In another embodiment, the oxidant is $H_2O_2$.

In one embodiment, the method of this invention makes use of an oxidant. In another embodiment the oxidant is a water soluble peroxygen oxidant. Non limiting examples of a water soluble peroxygen oxidant include $H_2O_2$, magnesium monoperoxyphthalate, sodium perborate, sodium percarbonate, urea hydrogen peroxide (UHP), or any combination thereof. In another embodiment, the peroxygen oxidant is $H_2O_2$. In another embodiment, the peroxygen oxidant is magnesium monoperoxyphthalate. In another embodiment, the peroxygen oxidant is sodium perborate. In another embodiment, the peroxygen oxidant is sodium percarbonate. In another embodiment, the peroxygen oxidant is urea hydrogen peroxide (UHP). In another embodiment, the peroxygen oxidant forms hydrogen peroxide under acidic reaction conditions.

In one embodiment, this invention provides a method for the preparation of a compound represented by the structure of Formula (I):

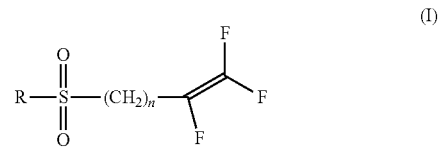

wherein R is heterocyclic ring selected from thiophene, thiazole, isothiazole, thiadiazole and thiatriazole, wherein the heterocyclic ring is optionally halogenated; and n is an integer between 1 and 6, comprising the step of contacting in a reaction mixture a compound represented by the structure of Formula (Ia):

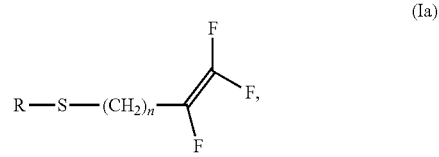

wherein R and n are as defined herein above with $H_2O_2$ in an acidic aqueous phase in the presence of a catalyst.

In one embodiment, this invention provides a method for the preparation of a compound represented by the structure of Formula (I):

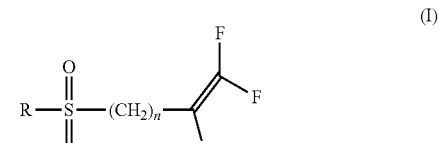

wherein R is heterocyclic ring selected from thiophene, thiazole, isothiazole, thiadiazole and thiatriazole, wherein the heterocyclic ring is optionally halogenated; and n is an integer between 1 and 6, comprising the step of contacting in a reaction mixture a compound represented by the structure of Formula (Ia):

(Ia)

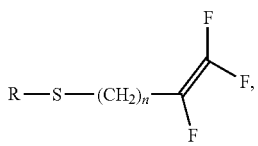

wherein R and n are as defined herein above with a peroxygen oxidant in an acidic aqueous phase in the presence of a catalyst.

In another embodiment, this invention provides a method for the preparation of a compound represented by the structure of Formula (II) or (III):

(II)

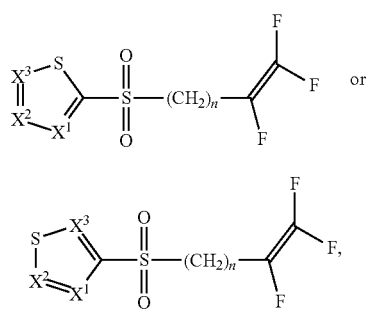

(III)

wherein $X^1$-$X^3$ are each independently selected from: C—H, C—F, C—Cl, C—Br, C—I and N; and n is an integer between 1 and 6; comprising the step of contacting in a reaction mixture a compound represented by the structure (IIa) or (IIIa):

(IIa)

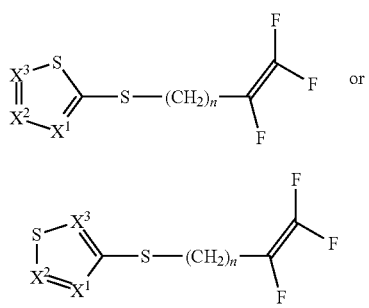

(IIIa)

with $H_2O_2$ in an acidic aqueous phase in the presence of a catalyst; wherein $X^1$-$X^3$ and n are as defined hereinabove.

In another embodiment, this invention provides a method for the preparation of a compound represented by the structure of Formula (II) or (III):

(II)

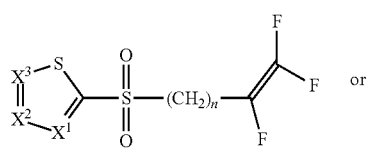

(III)

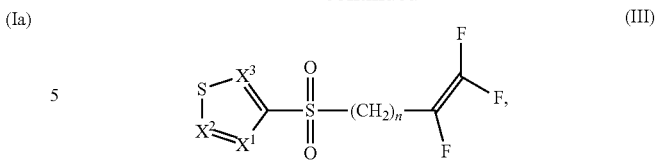

wherein $X^1$-$X^3$ are each independently selected from: C—H, C—F, C—Cl, C—Br, C—I and N; and n is an integer between 1 and 6; comprising the step of contacting in a reaction mixture a compound represented by the structure (IIa) or (IIIa):

(IIa)

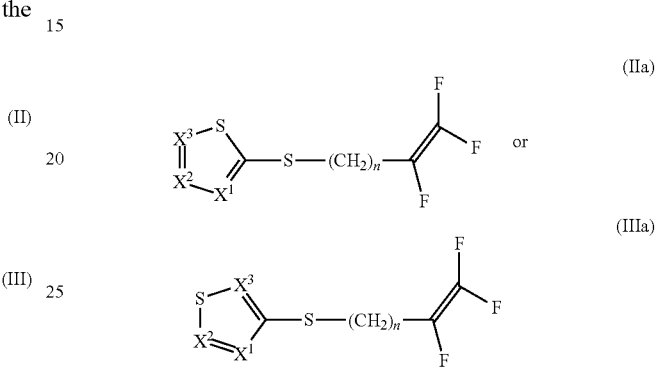

(IIIa)

with a peroxygen oxidant in an acidic aqueous phase in the presence of a catalyst; wherein $X^1$-$X^3$ and n are as defined hereinabove.

In another embodiment, $X^3$ is selected from: C—H, C—F, C—Cl, C—Br and C—I; and $X^1$ and $X^2$ are each independently selected from C—H and N.

In another embodiment, this invention is directed to a method of oxidation of 5-chloro-2-((3,4,4-trifluorobut-3-en-1-yl)thio)-1$\lambda^3$,3$\lambda^2$-thiazole to the corresponding sulfone, 5-chloro-2-((3,4,4-trifluorobut-3-en-1-yl) sulfonyl)-1$\lambda^3$, 3$\lambda^2$-thiazole (Fluensulfone), using metal oxide-based catalysts and an oxidant. In another embodiment, the oxidant is a peroxygen oxidant. In another embodiment, the oxidant is $H_2O_2$.

In one embodiment this invention is directed to a method for the preparation of 5-chloro-2-((3,4,4-trifluorobut-3-en-1-yl)sulfonyl)-1$\lambda^3$,3$\lambda^2$-thiazole or analogs thereof of formula I, II or III, comprising the step of contacting in a reaction mixture 5-chloro-2-((3,4,4-trifluorobut-3-en-1-yl) thio)-1$\lambda^3$,3$\lambda^2$-thiazole or the corresponding analogs thereof of formula Ia, IIa or IIa with aqueous $H_2O_2$ in an acidic aqueous phase in the presence of a catalyst. In another embodiment, this invention is directed to a method for the preparation of 5-chloro-2-((3,4,4-trifluorobut-3-en-1-yl) sulfonyl)-1$\lambda^3$,3$\lambda^2$-thiazole (Fluensulfone), comprising the step of contacting in a reaction mixture 5-chloro-2-((3,4,4-trifluorobut-3-en-1-yl)thio)-1$\lambda^3$,3$\lambda^2$-thiazole with aqueous $H_2O_2$ in an acidic aqueous phase in the presence of a catalyst.

In one embodiment this invention is directed to a method for the preparation of 5-chloro-2-((3,4,4-trifluorobut-3-en-1-yl)sulfonyl)-1$\lambda^3$,3$\lambda^2$-thiazole or analogs thereof of formula I, II or III, comprising the step of contacting in a reaction mixture 5-chloro-2-((3,4,4-trifluorobut-3-en-1-yl) thio)-1$\lambda^3$,3$\lambda^2$-thiazole or the corresponding analogs thereof of formula Ia, IIa or IIa with a water soluble peroxygen oxidant in an acidic aqueous phase in the presence of a catalyst. In another embodiment, this invention is directed to a method for the preparation of 5-chloro-2-((3,4,4-trifluorobut-3-en-1-yl)sulfonyl)-1λ$^3$,3λ$^2$-thiazole (Fluensulfone), comprising the step of contacting in a reaction mixture 5-chloro-2-((3,4,4-trifluorobut-3-en-1-yl)thio)-1λ$^3$,3λ$^2$-thiazole with a water soluble peroxygen oxidant in an acidic aqueous phase in the presence of a catalyst.

In one embodiment, the method for the preparation of 5-chloro-2-((3,4,4-trifluorobut-3-en-1-yl)sulfonyl)-1λ$^3$,3λ$^2$-thiazole or analogs thereof of formula I-III make use of a catalyst. In another embodiment, the catalyst is at least one metal oxide or metal oxide salt. In another embodiment the metal oxide comprises: tungsten oxide, molybdenum oxide, vanadium oxide, niobium oxide, tantalum oxide, rhenium oxide, titanium oxide, zirconium oxide, chromium oxide, hafnium oxide or combination thereof.

In another embodiment, the catalyst is at least one metal oxide salt of formula KM' O$_x$, wherein M is hydrogen, an alkali or alkaline earth metal;

M' is titanium, vanadium, chromium, zirconium, niobium, molybdenum, hafnium, tantalum, rhenium or tungsten;

x is an integer between 2-6; and q is an integer between 1-4.

In another embodiment M of formula M$_q$M'O$_x$ is hydrogen, alkali or alkaline earth metal. In another embodiment M is hydrogen, sodium, potassium, calcium or magnesium. In another embodiment, M' of formula KM' O$_x$ is titanium, vanadium, chromium, zirconium, niobium, molybdenum, hafnium, tantalum, rhenium or tungsten. In another embodiment x of formula KM' O$_x$ is an integer between 2-6. In another embodiment, x is 2, 3, 4, 5 or 6. In another embodiment q of formula KM' O$_x$ is an integer between 1-4. In another embodiment, q is 1, 2, 3 or 4.

In another embodiment, the at least one metal oxide salt is sodium vanadate, sodium molybdate or sodium tungstate or combination thereof. In another embodiment, the metal oxide salt is sodium tungstate.

In another embodiment, the catalyst is hydrated.

In another embodiment, the concentration of the catalyst in the reaction mixture is between 0.01-20 mol % vs. the starting material 5-chloro-2-((3,4,4-trifluorobut-3-en-1-yl)thio)-1λ$^3$,3λ$^2$-thiazole or analogs thereof of formula Ia, IIa or IIIa. In another embodiment, the concentration of the catalyst in the reaction mixture is between 1-10 mol % vs. 5-chloro-2-((3,4,4-trifluorobut-3-en-1-yl)thio)-1λ$^3$,3λ$^2$-thiazole or the analogs thereof of formula Ia, IIa or IIIa. In another embodiment, the concentration of the catalyst in the reaction mixture is between 1-5 mol % vs. 5-chloro-2-((3,4,4-trifluorobut-3-en-1-yl)thio)-1λ$^3$,3λ$^2$-thiazole or the analogs thereof of formula Ia, IIa or IIIa. In another embodiment, the concentration of the catalyst in the reaction mixture is between 0.01-1 mol % vs. 5-chloro-2-((3,4,4-trifluorobut-3-en-1-yl)thio)-1λ$^3$,3λ$^2$-thiazole or the analogs thereof of formula Ia, IIa or IIIa. In another embodiment, the concentration of the catalyst in the reaction mixture is between 0.01-2 mol % vs. 5-chloro-2-((3,4,4-trifluorobut-3-en-1-yl)thio)-1λ$^3$,3λ$^2$-thiazole or the analogs thereof of formula Ia, IIa or IIIa. In another embodiment, the concentration of the catalyst in the reaction mixture is between 0.01-3 mol % vs. 5-chloro-2-((3,4,4-trifluorobut-3-en-1-yl)thio)-1λ$^3$,3λ$^2$-thiazole or the analogs thereof of formula Ia, IIa or IIIa. In another embodiment, the concentration of the catalyst in the reaction mixture is between 0.01-4 mol % vs. 5-chloro-2-((3,4,4-trifluorobut-3-en-1-yl)thio)-1λ$^3$,3λ$^2$-thiazole or the analogs thereof of formula Ia, IIa or IIIa. In another embodiment, the concentration of the catalyst in the reaction mixture is between 0.01-5 mol % vs. 5-chloro-2-((3,4,4-trifluorobut-3-en-1-yl)thio)-1λ$^3$,3λ$^2$-thiazole or the analogs thereof of formula Ia, IIa or IIIa. In another embodiment, the concentration of the catalyst in the reaction mixture is between 0.01-8 mol % vs. 5-chloro-2-((3,4,4-trifluorobut-3-en-1-yl)thio)-1λ$^3$,3λ$^2$-thiazole or the analogs thereof of formula Ia, IIa or IIIa. In another embodiment, the concentration of the catalyst in the reaction mixture is between 0.01-10 mol % vs. 5-chloro-2-((3,4,4-trifluorobut-3-en-1-yl)thio)-1λ$^3$,3λ$^2$-thiazole or the analogs thereof of formula Ia, IIa or IIIa.

In another embodiment, the catalyst is recycled and reused. In another embodiment, the catalyst is reused. In another embodiment, the catalyst is not isolated and is reused within the reaction mixture.

In one embodiment, the method for the preparation of 5-chloro-2-((3,4,4-trifluorobut-3-en-1-yl)sulfonyl)-1λ$^3$,3λ$^2$-thiazole or analogs thereof of formula I, II or III make use of an acidic aqueous solution. It was found that the use of an acidic aqueous solution reduces the nucleophilicity of the hydrogen peroxide oxidant making it less reactive to the electrophilic trifluro-alkene moiety, especially when there is an adjacent sulfone or sulfoxide groups and thereby inhibits the reaction of the double bond with a peroxygen oxidant such as H$_2$O$_2$ and inhibits the formation of 34(5-chloro-1λ$^3$, 3λ$^2$-thiazol-2-yl)sulfonyl)propanoic acid side product or analogs thereof (e.g. Formulas (Ib-IIIb), see below). In another embodiment, the method for the preparation of the compound represented by Formulas (I)-(III):

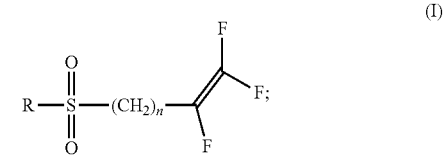

(I)

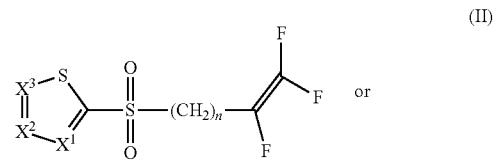

(II)

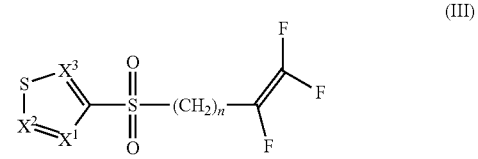

(III)

yields less than 15% by weight of the corresponding side product compounds represented by Formulas (Ib)-(IIIb):

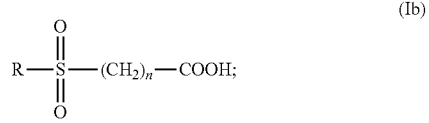

(Ib)

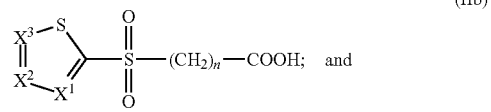

(IIb)

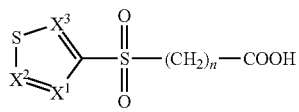

(IIIb)

wherein R, $X^1$-$X^3$ and n are as defined hereinabove. In another embodiment, the yield for the compound of Formulas (Ib)-(IIIb) is between 0-2% by weight. In another embodiment, the yield for the compound of Formulas (Ib)-(IIIb) is between 2-5% by weight. In another embodiment, the yield for the compound of Formulas (Ib)-(IIIb) is between 5-10% by weight. In another embodiment, the yield for the compound of Formulas (Ib)-(IIIb) is between 10-15% by weight. In another embodiment, the method for the preparation of 5-chloro-2-((3,4,4-trifluorobut-3-en-1-yl)sulfonyl)-1$\lambda^3$,3$\lambda^2$-thiazole yields less than 2% by weight of 3-((5-chloro-1$\lambda^3$,3$\lambda^2$-thiazol-2-yl)sulfonyl)propanoic acid side product.

In one embodiment, the method for the preparation of 5-chloro-2-((3,4,4-trifluorobut-3-en-1-yl)sulfonyl)-1$\lambda^3$,3$\lambda^2$-thiazole or analogs thereof of Formula I-III make use of an acidic aqueous solution. In another embodiment, the acidic aqueous phase comprises HCl, HBr, $H_2SO_4$, $H_3PO_4$, $MeSO_3H$, $CF_3SO_3H$ or combination thereof. In another embodiment, the acidic aqueous phase comprises $H_2SO_4$. In another embodiment, the concentration of the acid in the acidic aqueous phase is between 0.5-8 M. In another embodiment, the concentration of the acid in the acidic aqueous phase is between 1-6 M. In another embodiment, the concentration of the acid in the acidic aqueous phase is between 2-5 M.

In one embodiment, the method for the preparation of 5-chloro-2-((3,4,4-trifluorobut-3-en-1-yl)sulfonyl)-1$\lambda^3$,3$\lambda^2$-thiazole or analogs thereof of formula I-III, make use of an oxidant. In another embodiment, the oxidant is a peroxygen oxidant. In another embodiment, the oxidant is $H_2O_2$. In another embodiment, between 2-10 mole equivalents of the oxidant is added relative to 5-chloro-2-((3,4,4-trifluorobut-3-en-1-yl)thio)-1$\lambda^3$,3$\lambda^2$-thiazole or the analogs thereof of formula Ia-IIIa. In another embodiment, between 2-5 mole equivalents of the oxidant relative to 5-chloro-2-((3,4,4-trifluorobut-3-en-1-yl)thio)-1$\lambda^3$,3$\lambda^2$-thiazole or the analogs thereof of formula Ia-IIIa, is added. In another embodiment, between 2-4 mole equivalents of the oxidant is added relative to 5-chloro-2-((3,4,4-trifluorobut-3-en-1-yl)thio)-1$\lambda^3$,3$\lambda^2$-thiazole or the analogs thereof of formula Ia-IIIa. In another embodiment, between 3-3.5 mole equivalents of the oxidant relative to 5-chloro-2-((3,4,4-trifluorobut-3-en-1-yl)thio)-1$\lambda^3$,3$\lambda^2$-thiazole or the analogs thereof of formula Ia-IIIa, is added. In another embodiment the concentration of the aqueous hydrogen peroxide used is between 3% and 90% by volume (i.e. the commercial concentration of aqueous hydrogen peroxide). In another embodiment the concentration of the aqueous hydrogen peroxide used is between 20% and 60% by weight (i.e. the commercial concentration of aqueous hydrogen peroxide).

In one embodiment, the reaction mixture for the preparation of 5-chloro-2-((3,4,4-trifluorobut-3-en-1-yl)sulfonyl)-1$\lambda^3$,3$\lambda^2$-thiazole or analogs thereof of formula I-III is biphasic. In another embodiment, biphasic refers to an aqueous phase comprising an oxidant, a catalyst, and an acid, and an organic phase comprising the sulfide substrate, sulfone product and optionally a water immiscible organic solvent. In another embodiment, biphasic refers to an aqueous phase comprising an oxidant, a catalyst, and an acid and an organic phase comprising the sulfide substrate and sulfone product without a water immiscible organic solvent.

In one embodiment, the method for the preparation of 5-chloro-2-((3,4,4-trifluorobut-3-en-1-yl)sulfonyl)-1$\lambda^3$,3$\lambda^2$-thiazole or analogs thereof of formula I, II or III is a one phase reaction.

In one embodiment, the reaction mixture for the preparation of 5-chloro-2 ((3,4,4-trifluorobut-3-en-1-yl)sulfonyl)-1$\lambda^3$,3$\lambda^2$-thiazole or analogs thereof of formula I-III comprises water and does not include a water immiscible organic solvent. In another embodiment, the reaction mixture comprises water and water immiscible organic solvent. Non-limiting examples of a water immiscible organic solvents include hexane, pentane, toluene, methylcyclohexane, chlorobenzene, ethyl acetate and various ethers. In another embodiment the reaction mixture comprises water and water miscible solvent and/or surfactant. Non-limiting examples of a water miscible solvent include acetonitrile, methanol, ethanol, acetone, dimethylformamide, dimethylacetamide, n-methyl pyrrolidone or combination thereof. In another embodiment the reaction mixture comprises water and water immiscible organic solvent and/or surfactant.

In some embodiments, the surfactant may include but not limited to poly alkylene glycol, alkoxylated alcohol, alkyl sulfate salt or any combination thereof. In some embodiments, the surfactant comprises poly alkylene glycol, alkoxylated alcohol, alkyl sulfate salt or any combination thereof. Non limiting examples of surfactants include polyethylene glycol (such as PEG400), Polyoxyethylene lauryl ether (such as Brij35), dodecyl sulfate salt (such as SDS).

In one embodiment, the reaction for the preparation of 5-chloro-2-((3,4,4-trifluorobut-3-en-1-yl)sulfonyl)-1$\lambda^3$,3$\lambda^2$-thiazole or analogs thereof of formula I-III is carried out at a temperature ranging between 0° C. to 100° C. In another embodiment at a temperature of between 20° C. to 40° C. In another embodiment at a temperature of between 20° C. to 50° C. In another embodiment at a temperature of between 20° C. to 60° C. In another embodiment at a temperature of between 20° C. to 70° C. In another embodiment at a temperature of between 25° C. to 40° C. In another embodiment at a temperature of between 25° C. to 50° C. In another embodiment at a temperature of between 25° C. to 60° C. In another embodiment at a temperature of between 25° C. to 70° C. In another embodiment at a temperature of between 26° C. to 100° C. In another embodiment at a temperature of between 30° C. to 80° C. In another embodiment at a temperature of between 10° C. to 80° C. In another embodiment at a temperature of between 20° C. to 80° C. In another embodiment at a temperature of between 10° C. to 50° C. In another embodiment at a temperature of between 15° C. to 35° C. In another embodiment, at a temperature of at least 15° C. In another embodiment, at a temperature of at least 20° C. In another embodiment, at a temperature of at least 25° C.

In one embodiment, this invention is directed to 5-chloro-2-((3,4,4-trifluorobut-3-en-1-yl)sulfonyl)-1$\lambda^3$,3$\lambda^2$-thiazole or analogs thereof of formula I-III, prepared by the process of this invention. In another embodiment, the 5-chloro-2-((3,4,4-trifluorobut-3-en-1-yl)sulfonyl)-1$\lambda^3$,3$\lambda^2$-thiazole or analogs thereof of formula I-III, prepared by the process of this invention has purity of above 97%. In another embodiment, the 5-chloro-2-((3,4,4-trifluorobut-3-en-1-yl)sulfonyl)-1$\lambda^3$,3$\lambda^2$-thiazole or analogs thereof of formula I-III, prepared by the process of this invention, has no more than 1% by weight of 3-((5-chloro-1$\lambda^3$,3$\lambda^2$-thiazol-2-yl)sulfonyl)propanoic acid or analogs thereof, represented by Formulas (Ib-IIIb); in another embodiment less than 2% by weight 34(5-chloro-1$\lambda^3$,3$\lambda^2$-thiazol-2-yl)sulfonyl)propanoic acid or analogs thereof, represented by Formulas (Ib-IIIb), where Formulas (Ib-IIIb) are described hereinabove.

The following examples are presented in order to more fully illustrate the preferred embodiments of the invention. They should in no way be construed, however, as limiting the broad scope of the invention.

EXAMPLES

Example 1

Preparation of 5-chloro-2-((3,4,4-trifluorobut-3-en-1-yl)sulfonyl)-1$\lambda^3$,3$\lambda^2$-thiazole A mixture of sulfide, 5-chloro-2-((3,4,4-trifluorobut-3-en-1-yl)thio)-1$\lambda^3$,3$\lambda^2$-thiazole (14 g, 54 mmol), 20 mL 4 M sulfuric acid, 780 mg Na$_2$WO$_4$ (2.3 mmol, 4 mol %) was prepared and then 7 mL of 60% H$_2$O$_2$ (140 mmol) was added dropwise over a period of 2 hours. After 20 h at 22° C. analysis of the reaction mixture by HPLC showed the total conversion of the starting material and formation of the desired sulfone, 5-chloro-2-((3,4,4-trifluorobut-3-en-1-yl)sulfonyl)-1$\lambda^3$,3$\lambda_2$-thiazole with a 96% selectivity. The by-products were 3% sulfoxide, 5-chloro-2-((3,4,4-trifluorobut-3-en-1-yl)sulfinyl)-1$\lambda^3$,3$\lambda^2$-thiazole and 1% 3-((5-chloro-1$\lambda^3$,3$\lambda^2$-thiazol-2-yl)sulfonyl)propanoic acid. Yield—14.7 g Fluensulfone.

Example 2

Preparation of 5-chloro-2-((3,4,4-trifluorobut-3-en-1-yl)sulfonyl)-1$\lambda^3$,3$\lambda^2$-thiazole A mixture of sulfide, 5-chloro-2-((3,4,4-trifluorobut-3-en-1-yl)thio)-1$\lambda^3$,3$\lambda^2$-thiazole (14 g, 54 mmol), 20 mL 4 M sulfuric acid, 780 mg Na$_2$WO$_4$ (2.3 mmol, 4 mol %) was prepared and then 7 mL of 60% H$_2$O$_2$ (140 mmol) added dropwise over a period of 2 hours. After 7 h at 35° C. analysis of the reaction mixture by HPLC showed the total conversion of the starting material and formation of the desired sulfone, 5-chloro-2-((3,4,4-trifluorobut-3-en-1-yl)sulfonyl)-1$\lambda^3$,3$\lambda^2$-thiazole with a 91% selectivity.

Example 3

Preparation of 5-chloro-2-((3,4,4-trifluorobut-3-en-1-yl)sulfonyl)-1$\lambda^3$,3$\lambda^2$-thiazole A mixture of sulfide, 5-chloro-2-((3,4,4-trifluorobut-3-en-1-yl)thio)-1$\lambda^3$,3$\lambda^2$-thiazole (14 g, 54 mmol), 20 mL 4 M sulfuric acid, 390 mg Na$_2$WO$_4$ (1.65 mmol, 2 mol %) was prepared and then 7 mL of 60% H$_2$O$_2$ (140 mmol) added dropwise over a period of 2 hours. After 20 h at 22° C. analysis of the reaction mixture by HPLC showed the total conversion of the starting material and formation of the desired sulfone, 5-chloro-2-((3,4,4-trifluorobut-3-en-1-yl)sulfonyl)-1$\lambda^3$,3$\lambda^2$-thiazole with a 86% selectivity.

Example 4

Preparation of 5-chloro-2-((3,4,4-trifluorobut-3-en-1-yl)sulfonyl)-1$\lambda^3$,3$\lambda^2$-thiazole A mixture of sulfide, 5-chloro-2-((3,4,4-trifluorobut-3-en-1-yl)thio)-1$\lambda^3$,3$\lambda^2$-thiazole (14 g, 54 mmol), 20 mL 4 M phosphoric acid, 780 mg Na$_2$WO$_4$ (2.3 mmol, 4 mol %) was prepared and then 7 mL of 60% H$_2$O$_2$ (140 mmol) added dropwise over a period of 2 hours. After 20 h at 22° C. analysis of the reaction mixture by HPLC showed the total conversion of the starting material and formation of the desired sulfone, 5-chloro-2-((3,4,4-trifluorobut-3-en-1-yl)sulfonyl)-1$\lambda^3$,3$\lambda^2$-thiazole with a 75% selectivity due to extensive decomposition of H$_2$O$_2$.

Example 5

Aqueous Phase Recycling Experiments

Using the procedure in Example 1, a mixture of sulfide, 5-chloro-2-((3,4,4-trifluorobut-3-en-1-yl)thio)-1$\lambda^3$,3$\lambda^2$-thiazole (14 g, 54 mmol), 20 mL 4 M sulfuric acid, 780 mg Na$_2$WO$_4$ (2.3 mmol, 4 mol %) was prepared and then 7 mL of 60% H$_2$O$_2$ (140 mmol) was added dropwise over a period of 2 hours. After 20 h at 22° C. analysis of the reaction mixture by HPLC showed the total conversion of the starting material and formation of the desired Fluensulfone, 5-chloro-2-((3,4,4-trifluorobut-3-en-1-yl)sulfonyl)-1$\lambda^3$,3$\lambda^2$-thiazole with a 96% selectivity. After separation of the organic phase (comprising the sulfone product, not including an organic solvent) from the aqueous phase, 33% of the water phase was removed so as to keep the reaction volume constant upon addition of ⅓ of initial amounts of Na$_2$WO$_4$, H$_2$SO$_4$ and H$_2$O$_2$. Recycle experiments carried out it this way revealed that the conversion of 5-chloro-2-((3,4,4-trifluorobut-3-en-1-yl)thio)-1$\lambda^3$,3$\lambda^2$-thiazole and selectivity to Fluensulfone, were the identical within a range of ±1%.

Example 6

Preparation of 5-chloro-2-((3,4,4-trifluorobut-3-en-1-yl)sulfonyl)-1$\lambda^3$,3$\lambda^2$-thiazole A mixture of sulfide, 5-chloro-2-((3,4,4-trifluorobut-3-en-1-yl)thio)-1$\lambda^3$,3$\lambda^2$-thiazole (100 g, 370 mmol), 150 mL 2 M sulfuric acid, 5.5 gr Na$_2$WO$_4$ was prepared and then 65 gr of 50% H$_2$O$_2$ (955 mmol) added dropwise over a period of 1.5 hours at 10° C. The reaction mixture was stirred at room temperature for 30 minutes and then warmed to 40° C. and stirred for 13 hours. Analysis of the reaction mixture by HPLC showed the total conversion of the starting material and formation of the desired sulfone, 5-chloro-2-((3,4,4-trifluorobut-3-en-1-yl)sulfonyl)-1$\lambda^3$,3$\lambda^2$-thiazole. The product was isolated in 77% yield with 97% selectivity.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for the preparation of a compound represented by the structure of Formula (I):

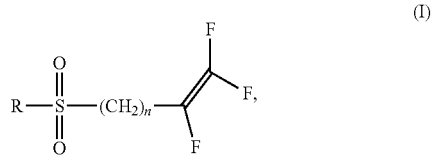

comprising a step of contacting in a reaction mixture a compound of Formula (Ia):

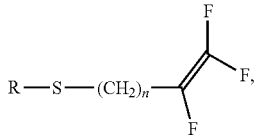

(Ia)

wherein, R is a heterocyclic ring selected from thiophene, thiazole, isothiazole, thiadiazole and thiatriazole, wherein the heterocyclic ring is optionally halogenated; and n is an integer between 1 and 6;

with a peroxygen oxidant in an acidic aqueous phase in the presence of a catalyst, wherein the acidic aqueous phase comprises HCl, HBr, $H_2SO_4$, $H_3PO_4$, $MeSO_3H$, $CF_3SO_3H$ or combination thereof.

2. A method for the preparation of a compound represented by the structure of Formula (I):

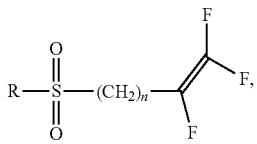

(I)

comprising a step of contacting in a reaction mixture a compound of Formula (Ia):

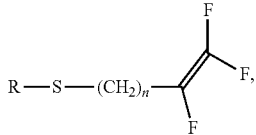

(Ia)

wherein, R is a heterocyclic ring selected from thiophene, thiazole, isothiazole, thiadiazole and thiatriazole, wherein the heterocyclic ring is optionally halogenated; and n is an integer between 1 and 6;

with $H_2O_2$ in an acidic aqueous phase in the presence of a catalyst, wherein the acidic aqueous phase comprises HCl, HBr, $H_2SO_4$, $H_3PO_4$, $MeSO_3H$, $CF_3SO_3H$ or combination thereof.

3. The method of claim 1, wherein the compound of the structure of Formula (I) is represented by the structures of Formula (II) or (III):

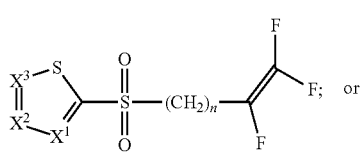

(II)

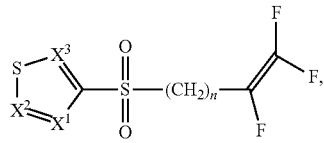

(III)

and the $H_2O_2$ is contacted with a compound represented by formula (IIa) or (IIIa):

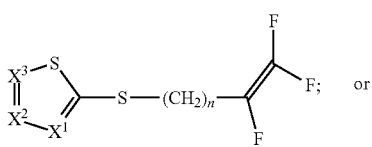

(IIa)

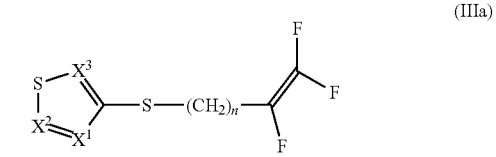

(IIIa)

in an acidic aqueous phase in the presence of a catalyst, wherein $X^1$-$X^3$ are each independently selected from: C—H, C—F, C—Cl, C—Br, C—I and N.

4. The method of claim 1, wherein the compound of the structure of Formula (I) is 5-chloro-2-((3,4,4-trifluorobut-3-en-1-yl)sulfonyl)-1$\lambda^3$,3$\lambda^2$-thiazole and the $H_2O_2$ is contacted with 5-chloro-2-((3,4,4-trifluorobut-3-en-1-yl)thio)-1$\lambda^3$,3$\lambda^2$-thiazole, in an acidic aqueous phase in the presence of a catalyst.

5. The method of claim 1, wherein the catalyst is at least one metal oxide.

6. The method of claim 5, wherein the metal oxide comprises tungsten oxide, molybdenum oxide, vanadium oxide, niobium oxide, tantalum oxide, rhenium oxide, titanium oxide, zirconium oxide, chromium oxide, hafnium oxide or combination thereof.

7. The method of claim 5, wherein the catalyst is at least one metal oxide salt of formula $M_qM'O_x$ wherein:

M is hydrogen, an alkali or alkaline earth metal;

M' is titanium, vanadium, chromium, zirconium, niobium, molybdenum, hafnium, tantalum, rhenium or tungsten, x is an integer between 2-6; and q is an integer between 1-4.

8. The method of claim 7, wherein the catalyst is sodium vanadate, sodium molybdate or sodium tungstate or combination thereof.

9. The method of claim 8, wherein the catalyst is sodium tungstate.

10. The method of claim 5 wherein the catalyst is hydrated.

11. The method of claim 1, wherein the concentration of the catalyst is between 0.01-20 mol % relative to the compound represented by Formula (I).

12. The method of claim 11, wherein the concentration of the catalyst is between 1-10 mol % relative to the compound represented by Formula (I).

13. The method of claim 11, wherein the concentration of the catalyst is between 1-5 mol % relative to the compound represented by Formula (I).

14. The method of claim 1, wherein the acidic aqueous phase comprises $H_2SO_4$.

15. The method of claim 1, wherein the concentration of the acid in the acidic aqueous phase is between 0.5M to 8M.

16. The method of claim 15, wherein the concentration of the acid in the acidic aqueous phase is between 2M to 5 M.

17. The method of claim 1, wherein between 2 mole to 10 mole equivalents of the $H_2O_2$ is added relative to the compound represented by formula (I).

18. The method of claim 17, wherein aqueous $H_2O_2$ is used at a concentration of between 3% to 90% by volume.

19. The method of claim 1, wherein the reaction mixture comprises water and is devoid of water immiscible organic solvent.

20. The method of claim 1, wherein the reaction is carried out at a temperature ranging between 0° C. to 100° C.

21. The method of claim 20, wherein the reaction is carried out at a temperature ranging between 15° C. to 35° C.

22. The method of claim 1, wherein the catalyst is recycled.

* * * * *